H. L. BEACH.
TRANSMISSION MECHANISM.
APPLICATION FILED DEC. 26, 1912.

1,097,904.

Patented May 26, 1914.
2 SHEETS—SHEET 1.

WITNESSES

INVENTOR
Henry L. Beach,
By T. Walter Fowler, Attorney

H. L. BEACH.
TRANSMISSION MECHANISM.
APPLICATION FILED DEC. 26, 1912.

1,097,904.

Patented May 26, 1914.
2 SHEETS—SHEET 2.

Witnesses
Philip E. Barnes
G. Manning

Inventor
Henry L. Beach,
By P. Walter Fowler
Attorney

UNITED STATES PATENT OFFICE.

HENRY L. BEACH, OF MONTROSE, PENNSYLVANIA.

TRANSMISSION MECHANISM.

1,097,904.  Specification of Letters Patent.  Patented May 26, 1914.

Application filed December 26, 1912. Serial No. 738,667.

*To all whom it may concern:*

Be it known that I, HENRY L. BEACH, a citizen of the United States, residing at Montrose, in the county of Susquehanna and State of Pennsylvania, have invented certain new and useful Improvements in Transmission Mechanism, of which the following is a specification.

This invention relates to a transmission mechanism especially designed for use in connection with the propulsion of motor driven vehicles, and the invention consists of the parts, and the constructions, arrangements and combinations of parts which I will hereinafter describe and claim.

Figure 1:
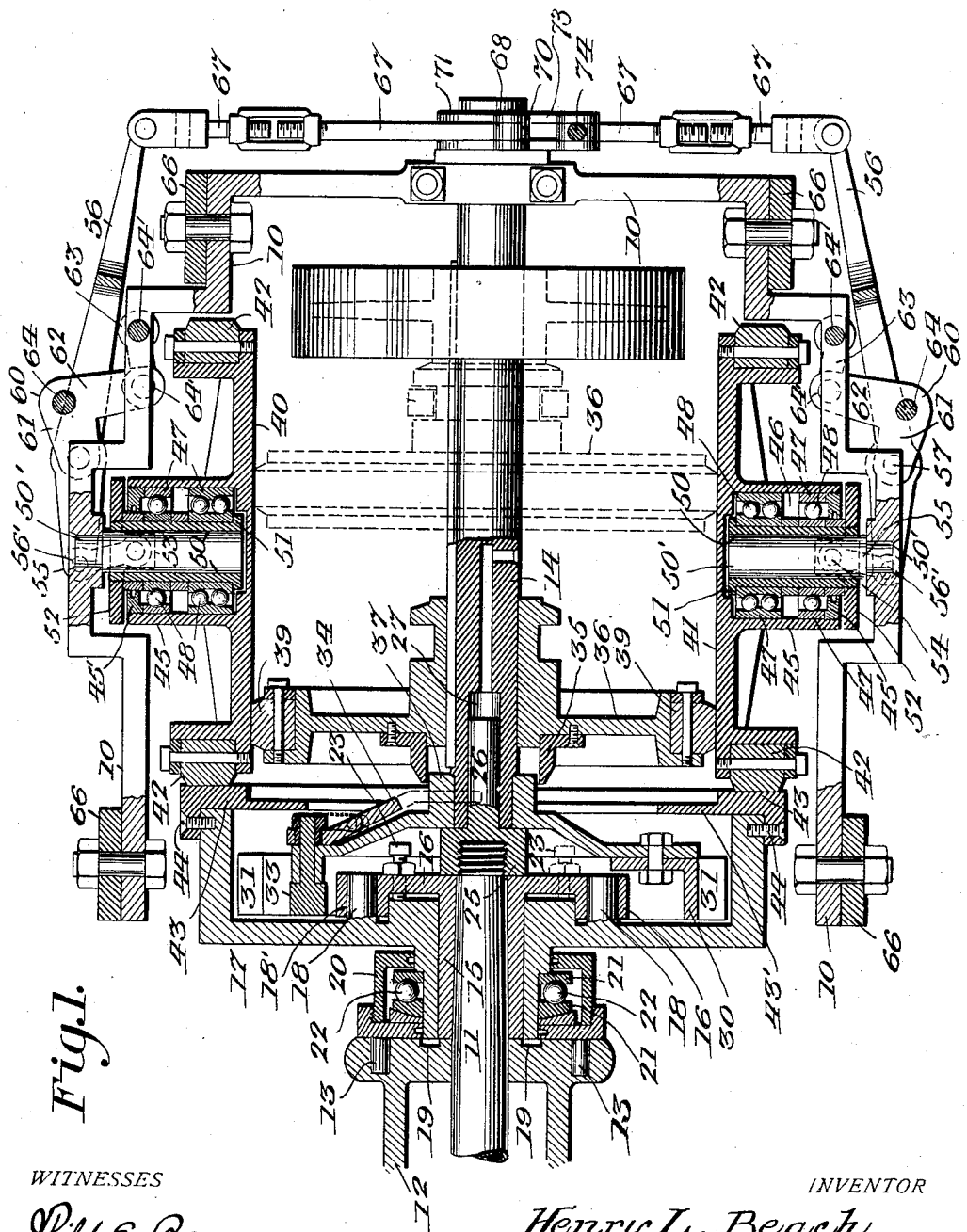
Figure 2:
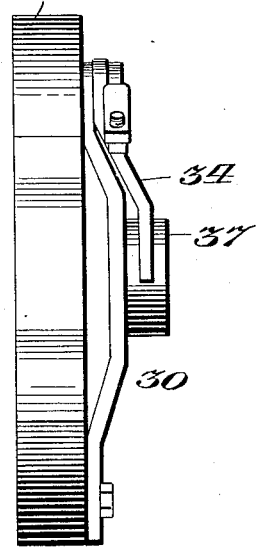
Figure 3:
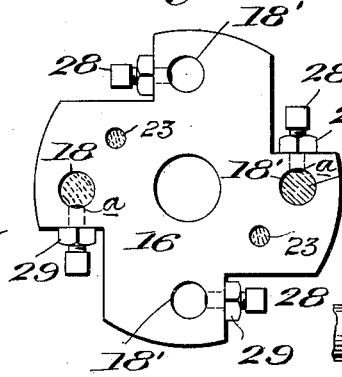
Figure 4:
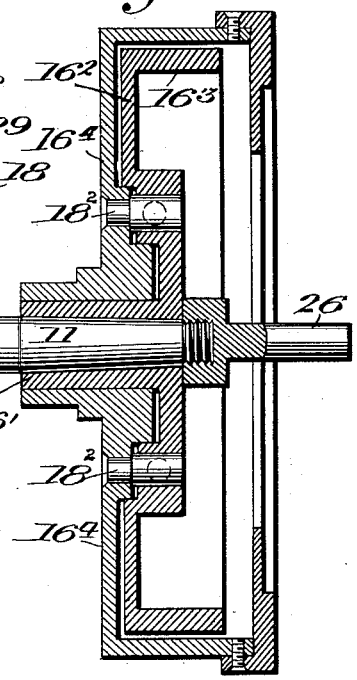

In the accompanying drawings forming part of this specification and in which similar reference characters indicate like parts in the several views; Figure 1 is a horizontal sectional view of a transmission mechanism embodying the salient features of my invention. Fig. 2 is a side elevation of a clutch suitable for connecting the driving and driven shafts. Fig. 3 is a plan view of the flanged sleeve, 16, through which motion is communicated to the fly-wheel of the machine. Fig. 4 is a vertical sectional view of a fly-wheel showing a flanged sleeve of slightly modified form.

In carrying out my invention I mount the transmission mechanism within an appropriate frame, 10, and which frame may be of any suitable construction, said frame being adapted to support and sustain the operating parts of the transmission, as I will hereinafter fully set forth.

The transmission mechanism is designed to be attached to the crank case, 12, of the engine and this may be done by any suitable means, as by fitting the case to appropriate studs, 13, which enter openings in the crank case, as shown in Fig. 1. The engine crank shaft, 11, and the driven shaft, 14, are arranged directly in line and are designed to be connected together through the medium of a suitable clutch mechanism, such as I will hereinafter describe.

Referring to Fig. 1, it will be seen that the crank shaft is embraced by the hub portion, 15, of a flanged sleeve 16, shown in detail in Fig. 3, which sleeve is designed to have its hub portion fixedly connected to the crank shaft and it has an internal bore of tapering-form adapted to fit the corresponding tapering crank shaft. This construction permits of the hub-portion of the sleeve being driven on the tapering crank-shaft by a wedging action to thereby more securely hold the sleeve to the shaft. Loosely mounted on the hub-portion of the flanged sleeve is the hub of the fly-wheel, 17, said fly-wheel being of suitable dimensions and adapted to house the clutch-mechanism which connects the crank-shaft to the driven-shaft, and said fly-wheel having on the inner surface of its vertical web the horizontally extending studs, 18. These studs are equi-distant and are of substantial thickness and as many of them may be used as may be found desirable, said studs adapted to enter openings, 18', formed in the flange of the sleeve near the edge thereof, and through these studs the fly-wheel is connected directly to the flanged sleeve, 16, which in turn is secured by keying or otherwise directly to the crank-shaft, it being understood that the fly-wheel thus rotates with said sleeve, but is permitted to have a slight longitudinal movement upon the extended hub-portion of the sleeve, 15. The studs, 18, may be cast integral with the fly-wheel or they may be made as separate elements suitably secured to said fly-wheel, without departing from the spirit of my invention, it being understood that in either event the studs will closely fit the holes, 18', in the flanged sleeve and that said studs will constitute the driving means for connecting the fly-wheel to the engine crank-shaft while at the same time permitting the fly-wheel to have a slight movement parallel with the axis of said shaft, this movement being provided by the hub-portion of the fly-wheel being loose upon the corresponding portion, 15, of the flanged sleeve, and by making a slight annular recess, 19, in the crank case, 12, in line with the outer end of the hub of the fly-wheel, as shown in Fig. 1.

Between the engine crank case, 12, and the fly-wheel and circumscribing the hub of said wheel, is an appropriate ball-bearing structure which is herein shown as comprising a housing or case, 20, formed of two threaded parts one of which is parallel with and fits closely against the crank case and the other lies adjacent and parallel to the inner side of the fly-wheel, said case inclosing ball-races, 21, between which suitable balls, 22, are mounted.

In order that any wear which may occur in the ball-races may be taken up or compensated for and the fly-wheel thus held perfectly true under working conditions, I provide for the aforesaid horizontal sliding movement of the fly-wheel on the hub of the flanged sleeve, 16, and for a longitudinal sliding movement of the studs, 18, in their respective openings in the flanged portion of said sleeve, and I obtain the necessary movement and adjustment referred to by means of set screws, 23, which are mounted in the sleeve and have their inner ends bearing against the fly-wheel, said screws being held after the necessary adjustment has been obtained, by means of lock nuts, of any suitable character. By the means described or others of an equivalent character, any wear which might arise in the ball bearing heretofore described can be readily taken up while the accurate running of the fly-wheel at all times is provided for; also, any lateral pressure brought upon the fly-wheel by the friction disks hereinafter mentioned, will be sustained by said ball bearing.

In order that the crank-shaft, 11, and the driven-shaft, 14, may be accurately alined, it is desirable that the crank-shaft be extended into the driven-shaft and to this end I have shown in Fig. 1, as one means for the purpose, a nut, 25, threaded on the end of the crank-shaft and having an extended portion 26, of substantial length entering a corresponding socket or bearing, 27, formed in the adjacent end of the driven-shaft; it will be readily understood, however, that any other suitable and well known connection may be used for the purpose specified.

To provide for any wear on the studs which might reduce the diameter of the said studs and thus provide for a slight movement of the flanged sleeve, and in order to hold the sleeve rigidly to the fly-wheel while allowing for the horizontal sliding movement of said wheel, as before explained, I may flatten the studs, 18, on one side and engage these flattened portions a by set screws, 28, Fig. 3, which are mounted in the flanged sleeve and are held in locked position after adjustment by means of jam-nuts, 29, or like fastenings.

The fly-wheel is connected to the driven shaft by means of any suitable clutch mechanism and a clutch suitable for my purpose I have shown as including a periphery, 31, forming a rim which may be similar to the frames of any of the well known form of clutches suitable for my purpose. As shown, the clutch is operated by a suitable cam block, 33, fixed to a lever, 34, adapted to expand the clutch when the lever is operated, said lever having its free end positioned to be operated upon by the wedge-shaped end, 35, of a shiftable or change speed friction wheel, 36. The clutch member herein shown and described is but one embodiment of a device which I may adopt for my purpose, and it forms no essential part of my present invention.

The clutch frame, which is disk-form, is provided with a hub portion, 37, which is fixed to the front end of the driven-shaft, 14, and the outer and active portion of the clutch is housed within the fly-wheel, which fly-wheel is herein shown as capable of holding a lubricant in which the cam-block and outer end of the lever may dip to thereby insure the automatic lubrication of said parts.

The change speed friction wheel, 36, is shiftably mounted on the driven-shaft by splining or otherwise fixing it thereto so that it may move longitudinally on the shaft, and its beveled or wedge-shaped end operates the lever, 34, of the clutch, said wheel having its periphery constructed to removably receive the friction annulus or rim, 39, which may be made in any suitable manner and of any material best suited for producing a friction drive, said annulus or rim adapted to frictionally engage the inner plane surface of the opposed vertical rotatable friction disks, 40, 41, said disks being arranged one at each side of the driven-shaft, 14, and just inside of the side portions of the frame, 10, and with their inner plane surfaces parallel with each other and with said shaft. The distance between the plane or friction faces of the opposed wheels, 40, 41, is just equal to the outer diameter of the annulus or friction rim, 39, carried by the shiftable friction wheel, said wheel adapted to be shifted along the faces of the opposed parallel friction wheels, 40, 41, toward and from the center thereof, to change the speed at which the machine may be driven, in the manner well known in the art of frictional gearing, it being understood that the friction wheel may be moved past the center of the friction disks, as indicated in dotted lines in Fig. 1, whenever it is desired to reverse the direction of motion of the machine.

Each friction disk, 40, 41, has its periphery formed of a removable annulus or friction rim, 42, adapted to frictionally engage a corresponding surface, 43, secured to the outer side of the fly-wheel, 17, and which latter surface may be removable by providing screws, 44, or other fastenings by which it is detachably fitted to said fly-wheel. The engaging surfaces, 42, 43, just referred to may be of any material found best suited for a friction drive, and the friction surface, 43, may be a plate or open center disk of substantially right-angled cross section and provided with an inwardly extending flange, 43′, which by extending over the inner edge of the fly-wheel forms an inclosing chamber for the circumferential or rim portion of the clutch, which is thereby substantially housed within the fly-wheel, but which is readily accessible through the open center of the plate or disk, 43.

Each of the opposed friction disks, 40, 41, is provided with a hub portion, 45, of substantial diameter into the outer end of which is screwed or otherwise fitted a plate, 45', which incloses the outer end of the chamber, 46, formed by said hub portion. In this chamber are placed suitable blocks, 47, forming race-ways for the balls, 48, there being in the outer portion of said chamber, a single annular series of balls while in the inner part of the chamber I have shown a double annular series of balls, the balls of each series being suitably confined between the opposed ball-races, 47, in such manner that the balls take up the thrust in all directions and thus insure the accurate free running of the friction disks, 40—41. The type of ball bearing referred to and shown in Fig. 1 may be considered as but one embodiment of a ball bearing which I may use in my improved transmission.

Placed interior to the hub of each friction, 40—41, and interior to the innermost of the blocks or rings, 47, which form the races for the ball bearings is a sleeve, 50, the inner end, 51, of which is flanged so as to bear against the innermost of the ball-races or rings, 47, said sleeve being supported on steel studs, 50', rigid with and projecting from the inner side of the frame, 10, said sleeve being non-rotatable and being adapted to thereby have a slight movement on said studs, 50', parallel with its axis and at right angles to the driven-shaft, 14, sufficient space being provided at each end of the sleeve for this purpose. The studs, 50', permit the friction disks, 40, 41, to be moved toward and from the change speed wheel, 36, and they support said disks and also take the strain of the thrust from the fly-wheel. The outer end of the sleeve, 50, has fixed to it a plate or bar, 52, which is provided with inwardly extending lugs, 53. To these lugs are pivotally mounted by bolts, 54, or otherwise, the short links, 55, said links having their outer ends pivotally connected to the inner short arms of the levers, 56, said levers being pivoted at 57 and the inner portions of the levers being forked so that the levers may straddle the adjacent portion of the supporting frame, 10, of the transmission mechanism, it being understood that this provides for the employment of a pair of spaced links, 55, on the inner ends of the forked levers, 56. In other words, each lever has its inner end connected to the plate or bar, 52, at top and bottom or at points substantially above and below the frame, 10.

To the vertical portion of each of the levers, 56, and pivotally mounted thereon are upper and lower bell-crank levers, 60, one arm, 61, of each of which extends substantially parallel with the frame, 10, while the other arm, 62, extends inwardly of this frame, the frame being preferably offset at this point as shown in Fig. 1, and the second-named arm, 62, of the lever being connected to one end of a horizontally-extending link, 63, which is bolted or otherwise fixed to the frame, 10, by means of bolts, 64'. The bell-crank levers are in practice connected in pairs by means of the pins or bolts, 64, and it will be understood that there will be one of the levers, bell-cranks, and connections, as described, at each side of the frame; in other words, the mechanism heretofore described for one side of the frame is duplicated at the opposite side and the outer ends of the levers, 56, at opposite sides of the frame are designed to be connected together so that the levers may be operated in unison as I will presently describe.

The frame which carries the transmission is designed to be suitably suspended from the frame of the car, so that the transmission frame, 10, may have a slight movement in a horizontal plane to carry the friction surfaces, 42, into and out of driving engagement with the corresponding friction surface, 43, of the fly-wheel, when it is desired to operate the car by a frictional drive, and to allow the frictional surfaces, 42, of the disks, 40, to be moved away from the friction surface, 43, of the fly-wheel when it is desired to drive the machine by direct drive, which may be resorted to during the greater period of time the car is in motion. This enables me to maintain the frictional surfaces idle during the greater portion of the running of the car and consequently reduces to a minimum the wear and the cost of maintenance of these most expensive parts of a frictional transmission mechanism. That the foregoing movements may be obtained I connect the opposite ends of each side of the transmission frame, 10, to vertical links, 66, the upper portions of which are in turn pivotally connected to some portion of the frame or chassis of the car.

The outer ends of the levers, 56, are pivotally connected to rods, 67, at the rear of the transmission, said rods being shown in Fig. 1, as extending inwardly toward the center line of the frame, 10, and having their inner ends appropriately connected to lugs, 70, formed at opposite points on the periphery of a collar or sleeve, 71, which is turnable on the end of a box or bearing, 68, which supports the rear end of the driven-shaft 14. The sleeve or collar, also, has a short arm, 73, projecting from it, and to this short arm is connected a rod, 74, which extends to one arm of a bell-crank lever, not shown, suitably fulcrumed on the frame of the machine. The arrangement and operation of these parts are described more at length in my companion application, Serial Number 760,618, filed Apr. 12/13 as a division of this application.

In Fig. 4, I have shown a modification of the flanged sleeve which is fixed to the drive-shaft and which has openings to receive the studs, $18^2$, which serve as the means for connecting a friction disk, $16^4$, to the drive-shaft, said sleeve, $16'$, in the instance noted, being provided with an extension, $16^2$, lying parallel with the vertical face of the friction disk and having an annular or rim portion, $16^3$, which is concentric with and lies within the rim of the friction disk. In this instance, the sleeve, $16'$, is securely fastened and keyed direct to the crank shaft (same as the sleeve, 15, in Fig. 1) and mounted upon its hub portion is the friction disk, $16^4$, which is free to move longitudinally, said disk being driven by the studs, $18^2$ and set screw adjustments being provided both for taking up lost motion in the ball bearings and in the studs, the same as described for the construction shown in Fig. 1.

From the foregoing description it will be understood that during the greater portion of the operation of the machine, I am enabled to operate the machine by a direct drive from the engine crank-shaft, the frictional gearing heretofore mentioned, being thus idle; but when desiring to run on low speed, the friction gearing may be brought instantly into action by the operation of the hand-lever, 85, when the drive will be from the engine crank-shaft through the fly-wheel and the friction wheels, 40—41, and interposed shiftable friction wheel to the driven-shaft. In starting the machine the shiftable friction wheel may be moved outwardly over the faces of the friction wheels, 40, 41, until when near the outer periphery of these wheels the beveled or wedge portion, 35, of the shiftable friction wheel will engage the clutch lever, 34, and thus operate the clutch to lock said clutch to the fly-wheel and thus produce a direct drive, it being understood that in this position the operator's foot lever has been released to remove the swinging frame so that the rims or frictional surfaces of the disks, 40, 41, are removed from driving connection with the friction surface of the fly-wheel. In throwing the friction disks, 40, 41, into driving engagement with the fly-wheel, the pressure of these disks is transmitted through the fly-wheel to the ball bearings direct and pressure upon these bearings is resisted by the engine crank-case, 12, which is regarded as the most rigid part of the machine.

I do not claim herein the before described friction wheels and means for operating the same as these features form the claimed subject matter of my companion application hereinbefore mentioned.

Having thus described my invention what I claim as new and desire to secure by Letters Patent is:—

1. The combination with a drive-shaft, of a flanged sleeve fixed thereto, a fly-wheel having a hub portion loosely mounted on said sleeve, a driving connection between a portion of the sleeve and the fly-wheel whereby motion is transmitted to the loose fly-wheel through said sleeve, a thrust bearing at one side of the fly-wheel and means at the opposite side of said fly-wheel for adjusting the wheel in a direction parallel with its axis.

2. The combination with a drive-shaft, of a sleeve having a hub portion fixed to the shaft and having a vertically-disposed flange, a fly-wheel having a hub portion loosely mounted on the hub of the sleeve, interengaging members between the fly-wheel and the flange of said sleeve and forming the means for directly driving the fly-wheel, a thrust bearing at one side of the fly-wheel, and means at the opposite side of the fly-wheel for adjusting said wheel in a direction parallel with its axis.

3. The combination with a drive-shaft of a driving connection associated therewith and comprising a sleeve fixed to the shaft and having a vertically extending flange, a fly-wheel loosely mounted on the sleeve, said fly-wheel and flange of the sleeve having interengaging studs and socket connections through which the fly-wheel is driven, a thrust bearing at one side of the fly-wheel and means at the opposite side of the fly-wheel for adjusting said wheel in a direction parallel with its axis.

4. The combination with a drive-shaft, of a sleeve fixed thereto having a vertically arranged flanged portion, a fly-wheel having a hub loosely mounted on the sleeve, said fly-wheel and flange of the sleeve having interengaging members comprising studs on one part projecting horizontally and openings in the other part alined with and adapted to receive said studs whereby the fly-wheel is driven direct from the sleeve through the medium of said studs, a thrust bearing at one side of the fly-wheel and means at the opposite side of the fly-wheel for adjusting said wheel in a direction parallel with its axis.

5. The combination with a drive-shaft, of a sleeve fixed thereto and having a vertically-disposed flange on one end, a crank-case, a fly-wheel having a hub portion loosely mounted on the sleeve, said fly-wheel being contained between the flange of the sleeve and the crank-case, a ball-bearing structure between the crank-case and the fly-wheel, said structure surrounding the hub of the fly-wheel and adapted to receive the lateral thrust thereof, said fly-wheel having studs projecting horizontally from its inner face and the flange of the sleeve having openings to receive said studs, whereby the fly-wheel is driven through the medium of the studs, and adjusting screws carried by the flange of the sleeve and engaging the fly-wheel and adapted to move the same parallel with its axis to compensate for wear in the ball bearing structure, and to insure the accurate rotation of the fly-wheel.

6. The combination with a drive-shaft, of a sleeve fixed thereto and having a vertically-disposed flange on one end, a crank-case, a fly-wheel having a hub portion loosely mounted on the sleeve, said fly-wheel being contained between the flange of the sleeve and the crank-case, a ball-bearing structure between the crank-case and the fly-wheel, said structure surrounding the hub of the fly-wheel and adapted to receive the lateral thrust thereof, said fly-wheel having studs projecting horizontally from its inner face and the flange of the sleeve having openings to receive said studs, whereby the fly-wheel is driven through the medium of the studs, and adjusting screws carried by the flange of the sleeve and engaging the fly-wheel and adapted to move the same parallel with its axis to compensate for wear in the ball-bearing structure, and to insure the accurate rotation of the fly-wheel, said fly-wheel being open on its inner side to give access to the adjusting screws.

7. The combination with a drive-shaft, of a sleeve fixed thereto and having a vertically-disposed flanged end, a fly-wheel loosely mounted on the sleeve, said fly-wheel having a series of horizontally-disposed studs, and said flange having a series of horizontally-disposed holes, adapted to slidably receive said studs whereby the studs form the driving connection between the sleeve and the fly-wheel and permit of a sliding movement of the fly-wheel parallel with its axis, a ball-bearing structure surrounding the hub of the fly-wheel and adapted to resist the lateral thrust of said wheel, and set screws for adjusting the fly-wheel toward the ball-bearing structure to compensate for wear thereof.

8. The combination with a drive-shaft, of a sleeve fixed thereto and having a vertically-disposed flanged end, a fly-wheel loosely mounted on the sleeve, said fly-wheel having a series of horizontally-disposed studs, and said flange having a series of horizontally-disposed holes adapted to slidably receive said studs, whereby the studs form the driving connection between the sleeve and the fly-wheel and permit of a sliding movement of the fly-wheel parallel with its axis, a ball-bearing structure surrounding the hub of the fly-wheel and adapted to resist the lateral thrust of said wheel, and set screws for adjusting the fly-wheel toward the ball-bearing structure to compensate for wear thereof, said studs being flattened on one side and screws engaging the flattened surfaces of the studs whereby the said studs may be held in adjusted position.

In testimony whereof I affix my signature in presence of two witnesses.

HENRY L. BEACH.

Witnesses:
 WILLIAM ROYALL,
 FRED ZWALLY.

Copies of this patent may be obtained for five cents each, by addressing the "Commissioner of Patents, Washington, D. C."